United States Patent [19]

Cochran

[11] 4,455,456
[45] Jun. 19, 1984

[54] DIGITAL SUPERVISORY CIRCUIT FOR A TELEPHONE SYSTEM

[75] Inventor: William T. Cochran, Milford, Conn.

[73] Assignee: International Telephone and Telegraph Corporation, New York, N.Y.

[21] Appl. No.: 371,846

[22] Filed: Apr. 26, 1982

[51] Int. Cl.³ .............................................. H04M 3/22
[52] U.S. Cl. .................................................. 179/18 FA
[58] Field of Search ........ 179/18 FA, 18 HB, 18 EB, 179/84 R, 84 A

[56] References Cited

U.S. PATENT DOCUMENTS

| 3,772,477 | 11/1973 | Richards | 179/16 EA |
| 4,022,980 | 5/1977 | Kitajewski et al. | 179/18 HB |
| 4,087,646 | 5/1978 | Brolin et al. | 179/18 FA |
| 4,362,908 | 12/1982 | Melindo | 179/18 HB |

OTHER PUBLICATIONS

"Active Transformers for Off-Hook Sensing in Telephone Applications", Bajorek et al., *IEEE Trans. on Magnetics*, vol. MAG-14, No. 5, Sep. 1978, pp. 1062-1064.

*Primary Examiner*—Thomas W. Brown
*Attorney, Agent, or Firm*—John T. O'Halloran; Jeffery P. Morris; Alfred C. Hill

[57] ABSTRACT

The digital supervisory circuit comprises an amplitude comparator and EXCLUSIVE-OR gate to provide an output signal indicating the difference in time an input signal is above and below a predetermined reference potential. This output signal is integrated in an up-down binary counter and also is coupled to a first logic circuit under control of the counter which provides a ring present supervisory signal when a first threshold is exceeded and a second logic circuit under control of the counter which provides a switch hook detection supervisory signal when a second threshold is exceeded. A hit-timing circuit is provided coupled to the counter and the first and second logic circuits to prevent response of the counter and second logic circuit to line transients.

28 Claims, 12 Drawing Figures

N = 150 TO 170
REN IS POSITIVE TRUE WHEN RINGING IS APPLIED
R/P = RING PRESENT
SHD = SWITCH HOOK DETECTION AS WELL AS RING TRIP AND DIAL PULSE DETECTION

CLOCK LOGIC
REN → Nx RING FREQUENCY
REN → VARIABLE CLOCK
UP, FULL SCALE → NO CLOCK
D, ZERO → NO CLOCK

CLEAR LOGIC
D, OFFSET → CLEAR
UP, FH → FULL SCALE

DIGITAL SUPERVISORY CIRCUIT FOR A TELEPHONE SYSTEM

BACKGROUND OF THE INVENTION

The present invention relates to telephone systems and more particularly to a supervisory circuit therefor.

There are three basic functions to be performed by a supervisory circuit serving an analog telephone subset, namely, (1) ring trip and ring present; (2) on-and-off hook detection and (3) dial pulse detection. A hit-timing provision is usually included in the supervisory circuit to obviate the likelihood of false responses due to line transients.

Ring present detection commonly uses an analog peak detector that monitors a voltage that is proportional to the AC (alternating current) ringing current. When this current is zero, the voltage is zero indicating that there is no ringing current. When the current rises to a value exceeding some threshold, the voltage at the output of the peak detector also crosses a threshold. If this remains for a sufficient period, a "ring present" indication is passed to the switching system from the supervisory circuit.

The ring trip detection is normally realized by using large capacitors to remove the large low frequency ringing signal so that the DC (direct current) current may be monitored by the off-hook detection circuit of the supervisory circuit. If the DC current is both at a threshold set on an analog comparator and it exists long enough, then a ring trip indication is passed to the switching system from the supervisory circuit.

On-and-off-hook detection is accomplished by creating a voltage proportional to the DC line current and comparing this voltage with a threshold set on an analog comparator. When the threshold is exceeded for a sufficient time, the off-hook indication is given by the supervisory circuit.

The thresholds are set to satisfy market requirements and the on-hook threshold is always lower than the off-hook threshold. This is called "hysteresis". It is usually accomplished by either changing the threshold voltage or providing positive feedback around the comparator to accomplish the same function.

Dial pulse detection is normally done using the on-and-off-hook detection circuit with the same threshold as required for hook detection.

Some of the disadvantages of the prior art supervisory circuits include (1) large value components are used to filter out large AC signals in order to detect DC signals; (2) the amplitude of reference voltages on analog amplitude comparators are difficult to make stable with time and temperature; and (3) peak detectors are difficult to construct in large scale integrated circuit environments.

SUMMARY OF THE INVENTION

An object of the present invention is to provide a digital supervisory circuit for a telephone system overcoming the above-mentioned disadvantages.

Another object of the present invention is to provide a digital supervisory circuit that does not require large value components for filtering large AC signals in order to detect DC signals.

Still another object of the present invention is to provide a digital supervisory circuit employing comparators that do not require stable amplitude reference potentials.

A further object of the present invention is to provide a digital supervisory circuit easily constructed as at least a portion of a large scale integrated circuit.

A feature of the present invention is the provision of a digital supervisory circuit for a telephone system comprising a first circuit responsive to an input signal representing at least one of a ring trip, ring present, on-hook, off-hook and dial pulses to provide an output signal indicating the difference in time the input signal is above and below a predetermined potential; a second circuit coupled to the first circuit to digitally integrate the output signal; a third circuit coupled to the first circuit and the second circuit, the third circuit having a first predetermined digital threshold to provide a ring present supervisory signal when the first threshold is exceeded; a fourth circuit coupled to the first circuit and the second circuit, the fourth circuit having a second predetermined digital threshold to provide a switch hook detection supervisory signal when the second threshold is exceeded; and a fifth circuit coupled to the second circuit, the third circuit and the fourth circuit to prevent response of the second circuit and the fourth circuit to line transients.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
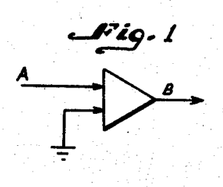
FIG. 1 is a block diagram of a comparator utilized in the supervisory circuit in accordance with the principles of the present invention.

Referring to FIG. 1, the comparator of the digital supervisory circuit of the present invention avoids large value components by measuring the time interval that a waveform (such as ringing) is above or below a predetermined reference potential, such as ground or some selected relatively low potential. The reference for the comparator in this case is ground and therefore not subject to variation. However, amplitude variation of a selected reference potential is not detrimental to the comparator of the present invention since time intervals are being detected, not amplitude. With a signal at A of FIG. 1 as illustrated in curve A of FIG. 2 which does not contain any DC voltage, the resultant output at B of FIG. 1 is as is illustrated in curve B of FIG. 2, namely, the time interval T1 above ground is equal to the time interval T2 below ground. On the other hand if there is DC at the input A of FIG. 1 as illustrated in curve A of FIG. 3, there will result the waveform at point B of FIG. 1 as illustrated in B of FIG. 3, namely, that a time interval T1 above ground is greater than the time interval T2 below ground.

Figure 2:
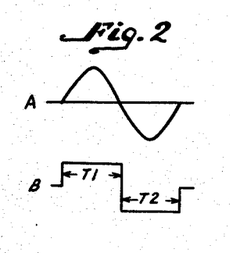
FIGS. 2 and 3 illustrate curves used in explaining the principle of the operation of the comparator of FIG. 1.
Figure 3:
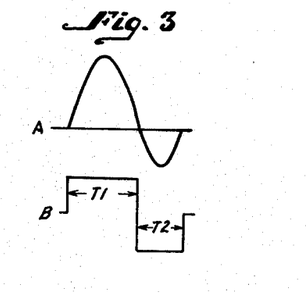

Ideally, the difference in T1 and T2 in the case of no DC at input A of FIG. 1 is zero as illustrated in FIG. 2. With DC at input of FIG. 1, however, the difference between the time interval T1 and the time interval T2 is significant. This difference may be measured digitally and is sensitive mainly to the DC signal, therefore, requiring no filtering of the AC signal.

Ring present is not a critical function. To accomplish this without a peak detector, the threshold value of a comparator will be used to establish ring present. With no ringing current, the voltage at input A of FIG. 1 is zero and the time intervals T1 and T2 simply do not exist. With ring current high enough to cause a voltage at input A that exceeds the threshold, then the time intervals T1 and T2 exist and are equal. This fact establishes "ring present".

Figure 4:
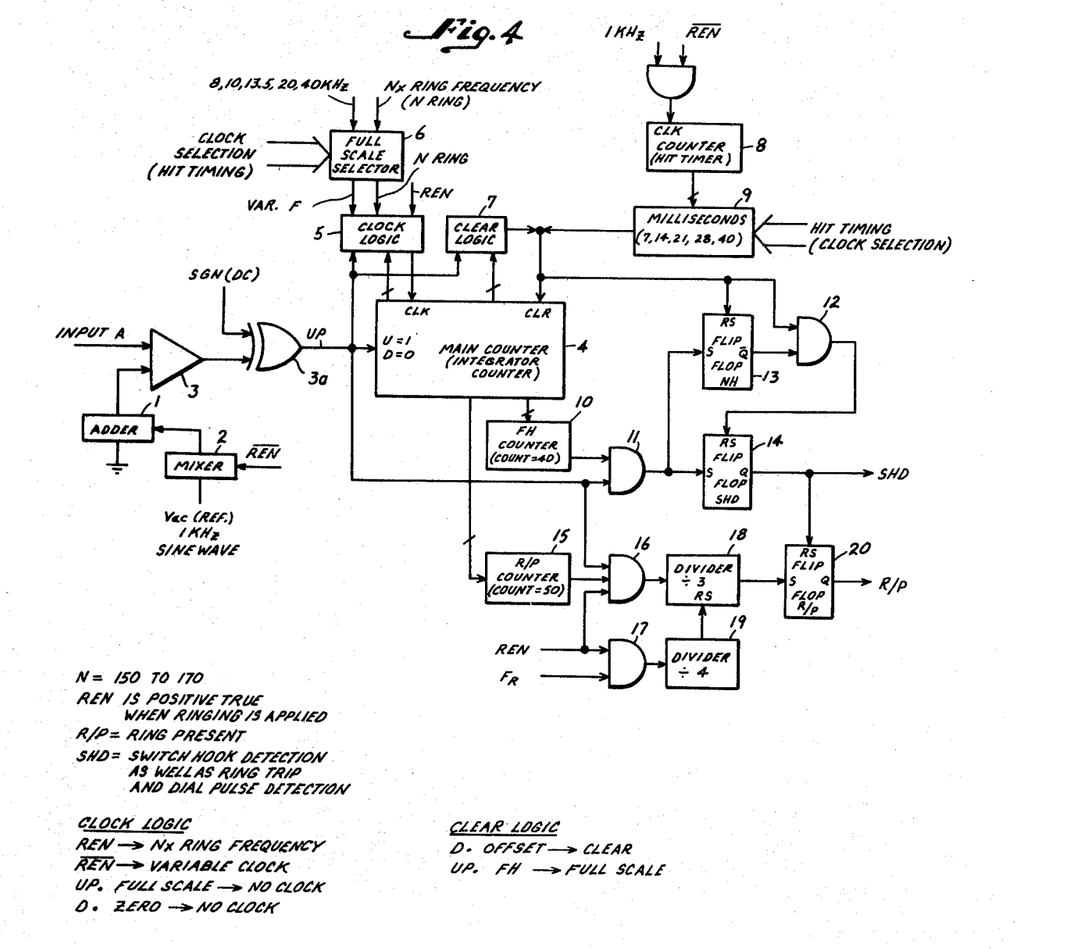
FIG. 4 is a block diagram of a digital supervisory circuit in accordance with the principles of the present invention.

When an originating call is anticipated, then a sine-wave is inserted into the comparator in place of ground as illustrated in FIG. 4 by means of the adder 1 and the mixer 2.

With no off-hook or no DC at input A, FIG. 2 applies. If off-hook occurs, FIG. 3 applies and the difference in the time intervals T1 and T2 is an indication of the presence of off-hook.

Hit timing may be accomplished by accumulating the differences between the time intervals T1 and T2 for some given period of time, in other words, until some numerical threshold is reached. The value of this threshold is easily accomplished by comparing the accumulated difference between the time intervals T1 and T2 with an externally set digital comparator.

The digital supervisory circuit of the present invention may be incorporated into a large scale integrated (LSI) circuit by itself or together with other functions. The digital supervisory circuit disclosed herein has the versatility necessary to satisfy ring present, ring trip, on-and-off hook detection in line circuits and supervisory functions in analog trunk circuits for all known applications of telephone lines and trunks.

Referring to FIG. 4, the digital supervisory circuit in accordance with the principle of this invention is shown in block diagram form as including the comparator 3 having a ground reference potential whose output is coupled via an EXCLUSIVE-OR gate 3a to a main or integrating counter 4 whose clock input is provided by clock logic 5 having the input frequency thereof selected by the full scale selector 6 which cooperates with the hit timing provisions of the instant circuit as will be described later on. The clear or load logic 7 causes the full scale values to be loaded into counter 4 under certain conditions and to load zero into the counter 4 under other conditions. The hit timing is provided by the hit timer clock 8 and the timing selector 9 to prevent line transients from providing false responses for ring present and switch hook detection. The switch hook detection circuit includes FH counter 10 coupled to counter 4 having a count threshold established therein cooperating with AND gates 11 and 12 and RS flip-flops 13 and 14. The just described switch hook detection circuit not only detects on-off hook conditions but also detects ring trip and dial pulses.

The ring present detection circuit includes R/P counter 15 coupled to counter 4 together with AND gates 16 and 17 and dividers 18 and 19 in cooperation with RS flip-flop 20.

The requirements of the circuit of FIG. 4 are:

(1) Off Hook: 12 ma (milliamperes) (must not be at 10 ma)
(2) Off Hook: 8.5 ma (must not be at 7 ma)
(3) Off Hook: 3.4 ma (must not be at 2.8 ma)
(4) Off-Hook: 2.0 ma (must not be at 1.8 ma)
   On Hook: 8.5 (must not be at 11 ma)
   Hit Detection: Ignore on-hook and off-hook transitions from 5 to 29 ms (milliseconds) (programmable)
   Dial Pulse: Using (1) for off-hook, speeds 7 to 24 pulses per second—
   Shortest make: 10 ms
   Shortest break: 15 ms
   (The hit timer must be consistent with detecting dial pulses).
   Ring Trip: Less than 200 ms for all frequencies.
   Ring Present: 3 cycles of ring current equal to or greater than 5 ma (input compared to ground potential).

Ring present is detected as follows. When ring current is flowing, a replica of it appears at the input A of comparator 3. The sine-wave-like signal is compared to a ground reference potential at the input to comparator 3. The output of the comparator is high during the time the signal on input A exceeds the reference voltage. Assuming that SGN (DC) equals logic zero, the counter 4 will count up when the output of the comparator is high. The clock for the counter from clock logic 5 is a fixed multiple of the ring frequency.

A program was written for a Texas Instruments 59 calculator to simulate the response of the circuit of FIG. 4. By experimenting with this simulation, thresholds were set so that the response satisfied the above requirements. The following table was generated using the program:

TABLE I

| TIME IN MILLISECONDS FOR ONE R/P INDICATION | | | |
|---|---|---|---|
| | CLOCK = RING FREQUENCY X | | |
| RING FREQUENCY | 150 | 160 | 170 |
| 16 | 20.9 | 19.8 | 18.5 |
| 20 | 16.7 | 15.8 | 14.8 |
| 30 | 11.1 | 10.5 | 9.9 |
| 50 | 6.7 | 6.3 | 5.9 |
| 66 | 5.1 | 4.8 | 4.5 |

Table I assumes 5 ma ring current and a 0.15 volts as the reference voltage. The threshold count of counter 15 is 50. Under these conditions the minimum detectable ring current as a function of reference voltage is:

| REFERENCE VOLTS | MINIMUM FOR R/P (ma) |
|---|---|
| 0.13 | 3.9 |
| 0.14 | 4.2 |
| 0.15 | 4.5 |
| 0.16 | 4.7 |
| 0.17 | 5.0 |
| 0.18 | 5.3 |
| 0.19 | 5.6 |
| 0.20 | 5.9 |

Over the range of reference voltages, the time to R/P (ring present) changes no more than 0.1 ms from the times shown in the table. It is recommended that the reference voltage be 0.15±5% volts.

To detect ring tip during ringing, the ringing in the line circuit (assuming per line ringing) will have a very low output impedance. When off-hook occurs, the ringing current increases dramatically thus going into a current limiting mode at 35 ma. The minimum off-hook current is 60/2000=30 ma. The minimum DC current is 23 ma. Using this information, the simulation program shows:

TABLE II

Ring Current = 30 ma, DC = 23 ma, Vref = 0.15
TIME IN MILLISECONDS TO R/T

| RING FREQUENCY | CLOCK = RING FREQUENCY X | | |
|---|---|---|---|
| | 150 | 160 | 170 |
| 16 | 209.2 | 162.1 | 158.7 |
| 20 | 167.4 | 129.7 | 126.9 |
| 30 | 111.6 | 86.5 | 84.6 |
| 50 | 67.0 | 61.9 | 50.8 |
| 66 | 50.7 | 39.3 | 38.5 |

Variation in the reference voltage causes the numbers to change ±3.7%.

TABLE III

Ring Current = 35 ma, DC = 60 ma, Vref = 0.15
TIME IN MILLISECONDS TO R/T

| RING FREQUENCY | CLOCK = RING FREQUENCY X | | |
|---|---|---|---|
| | 150 | 160 | 170 |
| 16 | 85.4 | 80.1 | 75.4 |
| 20 | 68.3 | 64.1 | 60.3 |
| 30 | 45.6 | 42.7 | 40.2 |
| 50 | 27.3 | 25.6 | 24.1 |
| 66 | 20.7 | 19.4 | 18.3 |

The variation in the reference voltage causes nearly no effect in the conditions of Table III.

During quiet interval (Off-Hook), when ringing is in its off cycle but off-hook has not occurred, then the circuit reverts to the form that it has for the "normal" off-hook detection, namely, $I_{dc}$ equal to or greater than 12 ma—must be off hook; $I_{dc}$ less than 10 ma—must not be off hook. The simulation program shows:

TABLE IV

Reference Signal 1000 Hz, Vref = 0.15 ± 5% Volts
Vac (ref) = 0.45 ± 5% Volts
TIME IN MILLISECONDS TO FH

| CLOCK (KHz) | DC CURRENT (ma) | | | | CLEARED EVERY ( ) ms |
|---|---|---|---|---|---|
| | 10 | 11 | 12 | 13 | |
| 8 | 40.7 | 40.7 | 25.6 | 25.6 | 35 |
| 10 | 40.6 | 29.2 | 20.5 | 20.5 | 28 |
| 13.5 | 25.4 | 22.5 | 15.2 | 15.2 | 21 |
| 20 | 18.4 | 15.5 | 10.3 | 10.3 | 14 |
| 40 | 8.5 | 7.4 | 5.1 | 5.1 | 7 |

Loading the counter 4 with zeros or clearing thereof is accomplished by logic 7 and is done periodically to keep low currents ($I_{dc}$ less than 10 ma) from causing an off-hook detection. The timing is such that, under certain combinations of tolerances, 11 ma will cause off-hook, but 10 ma never does. The objective is to give hit protection on the order of 7, 14, 21, 28 and 40 ms. There are possibly other configurations that could do the same thing better or more simply. (For example, the threshold of counter 10 could be made 200, 160, 120, 80 and 40 to give the desired results with an 8 KHz clock).

The more sensitive off-hook detection levels are accomplished using variable digital thresholds set by the programming of the hit timing and the full-scale selecter.

For on-hook detection, the gain is set to 1.1. This causes Table IV to be made 10% more sensitive and the hardware is then set up to define "no off-hook" as "on-hook". For example, suppose the time limit on hits is 7 ms. If the output of counter 10 becomes true before the time limit, flip-flop 13 is set, thus blocking the clear pulse to flip-flop 14. If the current is less than about 9 or 10 ma, then the output of counter 10 will not be true before the clear pulse and SHD, the output of flip-flop 14, will go to zero.

Figure 5A:
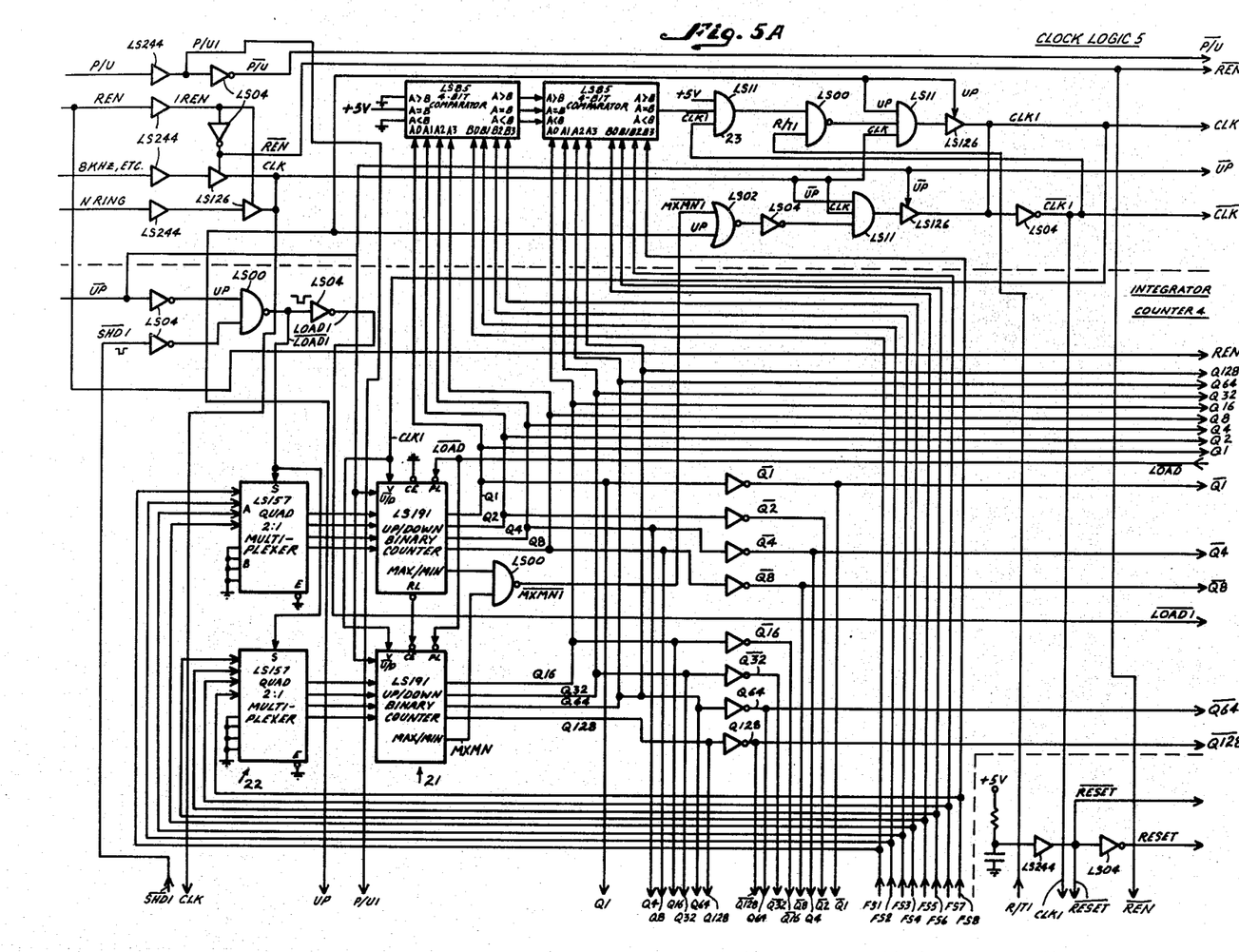
FIGS. 5A–5E when organized as shown in FIG. 5F illustrates a logic diagram of one embodiment of the digital supervisory circuit of FIG. 4.
Figure 5B:
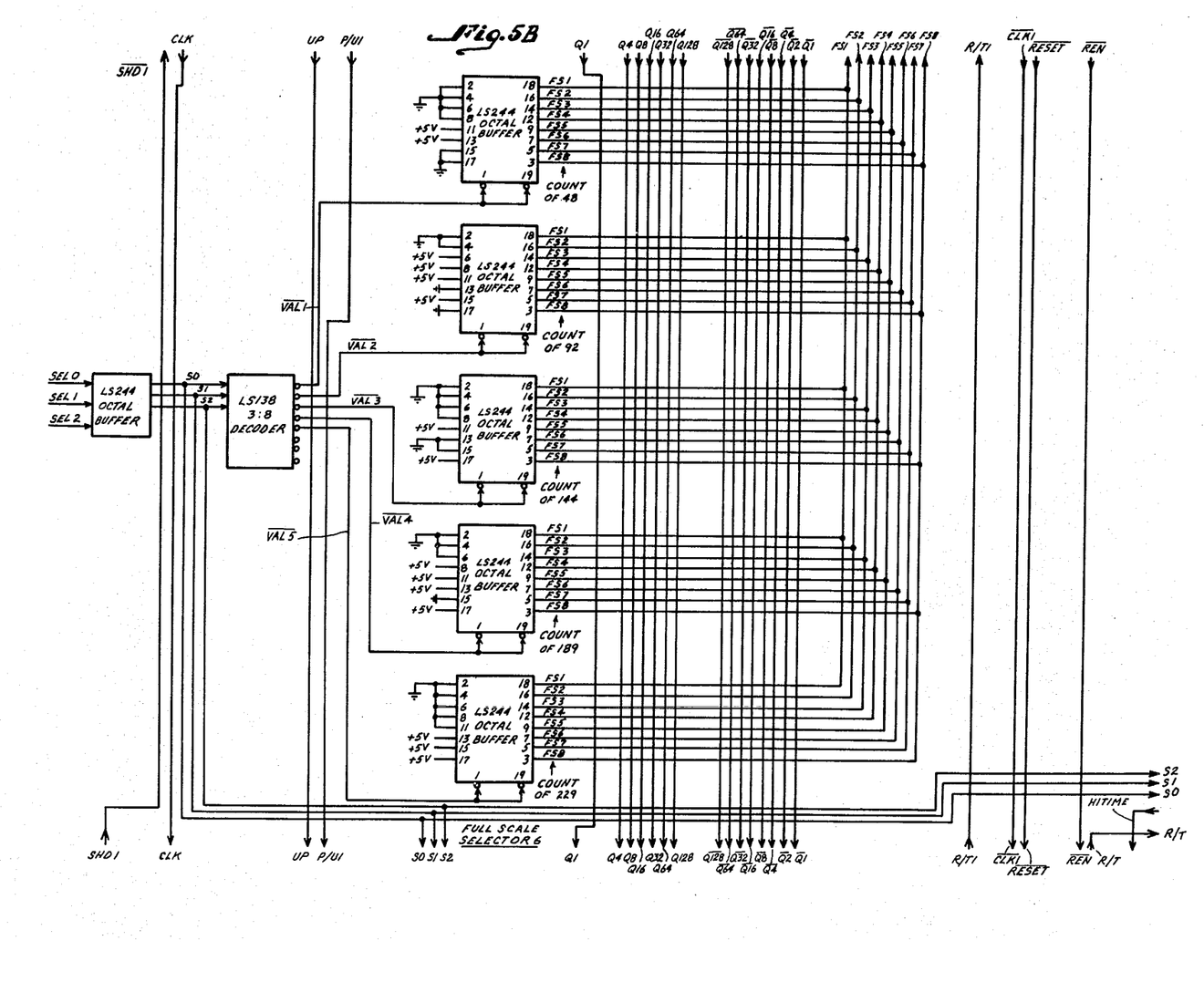
Figure 5C:
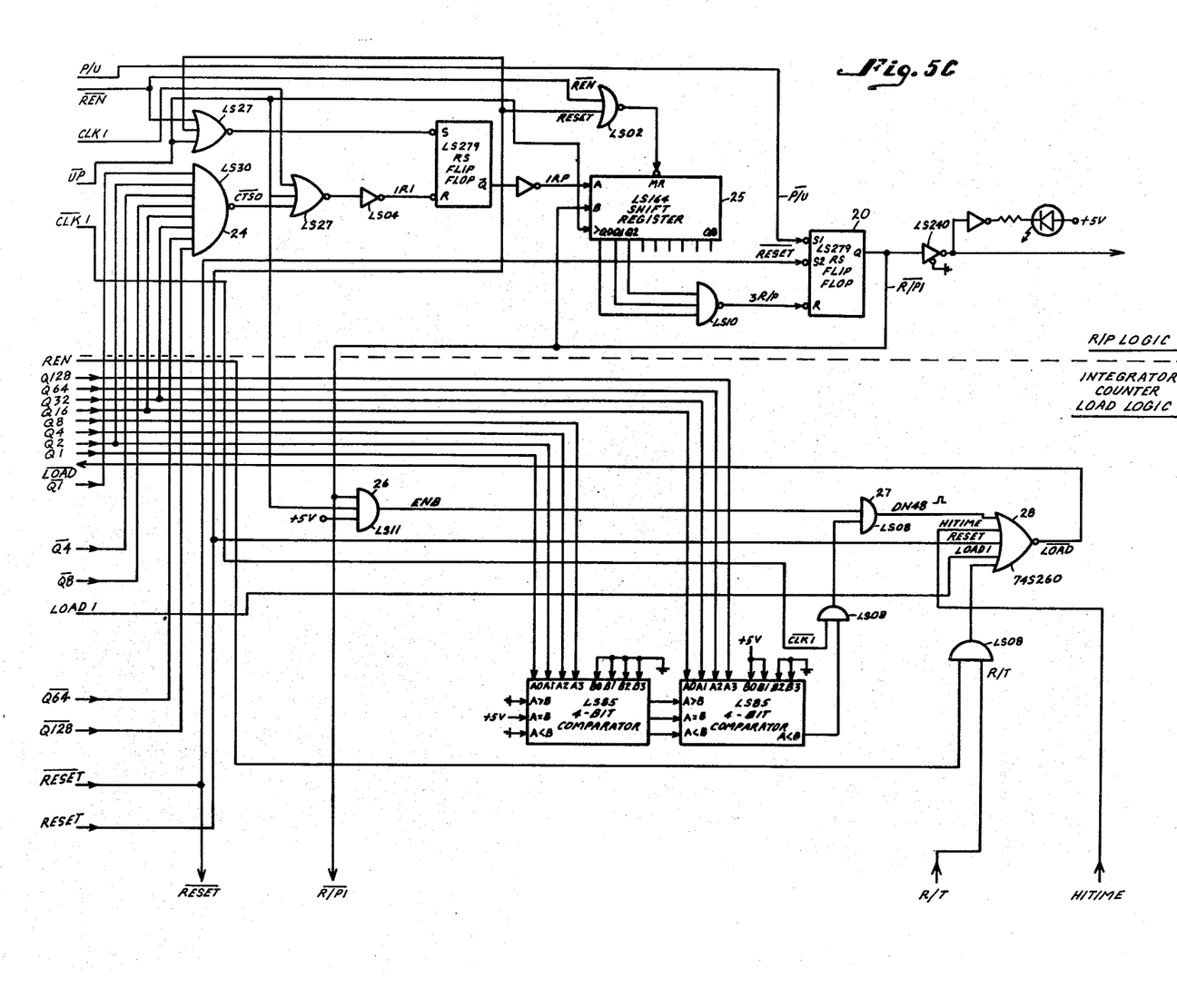
Figure 5D:
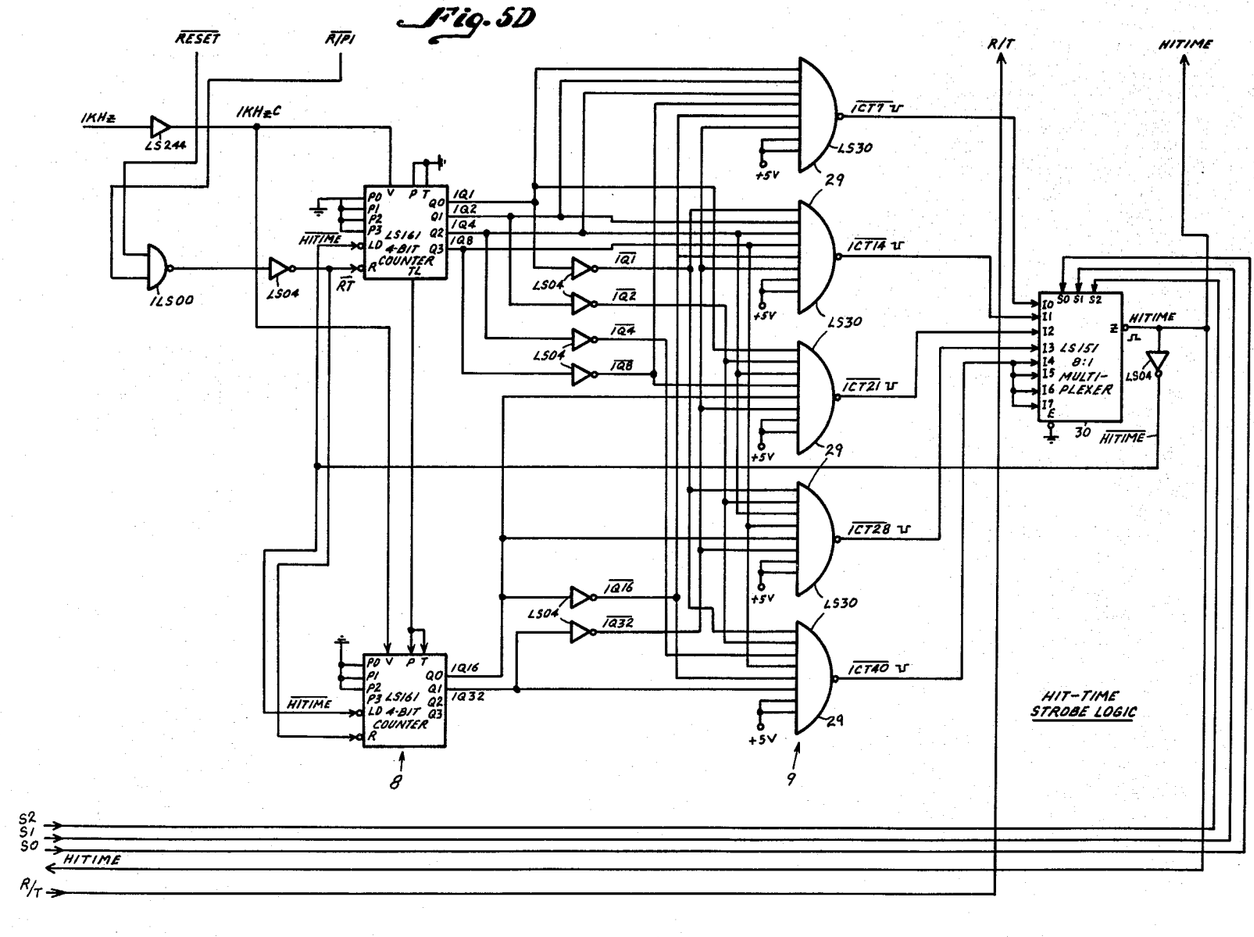
Figure 5E:
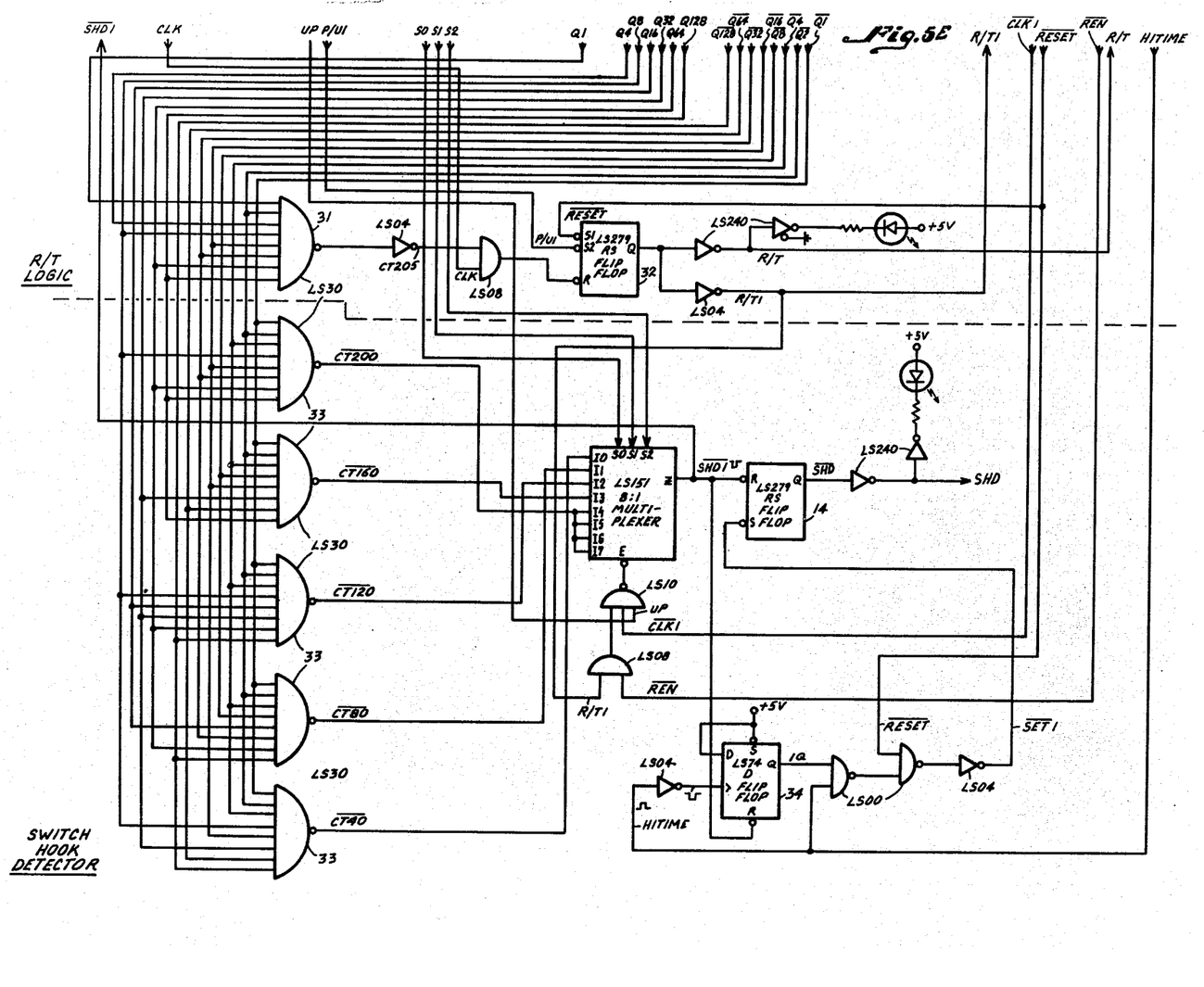
Figure 5F:
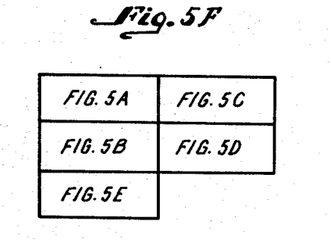

Referring to FIGS. 5A–5E when organized as illustrated in FIG. 5F, there is illustrated a logic diagram for one embodiment of the digital supervisory circuit of FIG. 4. It should be observed that each of the logic components have a LS number attached thereto. This number is the component number of the logic components manufactured by Texas Instruments which components have been utilized in a successful reduction to practice of the digital supervisory circuit of the present invention.

When $\overline{LOAD}$ is true either FS1–8 (full scale selection value) or logic zero value is loaded into the up-down counter 21 via the multiplexer 22. $\overline{LOAD\ 1}$ is true when counting up and off-hook is detected. $\overline{LOAD}$ is true when (a) LOAD 1 is true or (b) HIT TIME is reached (only after R/T (ring trip) is detected). CLK 1 for counter 21 is generated in clock logic 5. When $\overline{LOAD\ 1}$ is logic zero, full-scale (FS1–8) values are loaded, otherwise a logic zero value is loaded into counter 21. The RESET and $\overline{RESET}$ are power for resetting various components in the logic circuit of FIGS. 5A–5E.

Clock logic 5 provides the CLK and CLK1 and its inverse. When REN is true, the signal CLK equals NRING. Otherwise CLK equals 8 KHz. When the count of counter 21 is greater than or equals the full-scale value selected (FS) and R/T1=logic 1, i.e., ring tip has occurred, then signal CLK1 for counting up is logic zero ($\overline{CLK1}$ is gated with A≧B in gate 23 to get rid of glitches). Full scale is applied for ON-HOOK-OFF-HOOK detection only. During counting down ($\overline{MXMN1}\cdot UP$)=logic 1 when count zero is not reached in "down counting" and UP=Logic 1 for counting down, so that $\overline{CLK1}$ goes through this path to counter 21. When counting down and count equals zero, then ($\overline{MXMN1}\cdot UP$) equal logic 1 and CLK1=logic 0.

In full scale selector 6, as illustrated in FIG. 5B, depending on the values on the input SEL 0,1 and 2, one of the outputs $\overline{VAL1}$ to $\overline{VAL5}$ is active and thus one of the counts 48, 92, 144, 189 and 229 is selected. The circuit uses different FH thresholds with one 8 KHz frequency clock during "no ringing" periods. This selected value of FS1-FS8 is loaded into counter 21 when the signal $\overline{LOAD}$ is equal to logic zero.

In the R/P logic of FIG. 5C upon reaching a count of 50 ($\overline{CT50}$ equals a logic zero) at the output of NAND gate 24 and on "up count", 1RP is a logic 1 applied to shift register 25. At the end of an up count as the signal $\overline{UP}$ goes to logic 1 (i.e., starts "down count"), shift register 25 is clocked. If for three consecutive clocks 1RP is a logic 1, then 3R/P is a logic 1 and, therefore, R/P is a logic 1. During "down" count, 1RP is a logic zero. Also, shift register 25 is cleared when $\overline{REN}$ equals a logic 1 (false). The output R/P is reset when power up (P/U=logic zero) is applied to the flip-flop 20.

Figure 6:
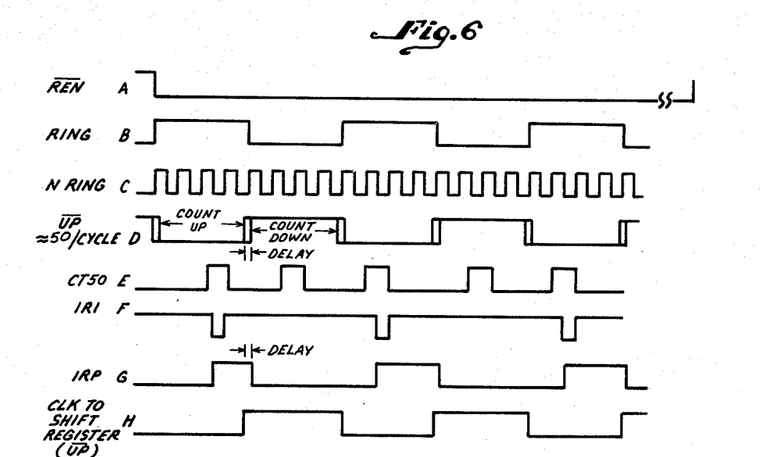
FIG. 6 is a timing diagram illustrating the operation of the R/P logic circuit of FIG. 5C.

FIG. 6 is a timing diagram illustrating the operation of the R/P logic of FIG. 5C.

Integrator counter clear or load logic 7 is shown in FIG. 5C. ENB is a logic 1 at the output of AND gate 26 when counting down ($\overline{UP}$ is a logic 1) and R/P 1 is a logic 1, i.e., ring present not detected. Also, at the same time, if the count of 48 or less is reached on down count, the output DN48 at AND gate 27 goes high. Thus, $\overline{\text{LOAD}}$ at the output of NAND gate 28 is generated for the counter 21 for the conditions mentioned hereinabove with respect to counter 21 and FIG. 5A. The DN48 pulse causes counter 21 to be loaded with a value of zero. The hit time logic 12 shown in FIG. 5D includes a time counter 8 which is clocked by a 1 KHz (kilohertz) signal and the counts 7, 14, 21, 28 and 40 MS are decoded in circuit 9 by the NAND gates 29 producing the outputs $\overline{\text{1CT7}}$, $\overline{\text{1CT14}}$, $\overline{\text{1CT21}}$, $\overline{\text{1CT28}}$ and $\overline{\text{1CT40}}$. These outputs are coupled to multiplexer 30 which depending upon the value of the signals S0,S1 and S2 produced in full scale selector 6 of FIG. 5B, one of the values 7, 14, 21, 28 and 40 is selected, providing an output HITIME. When the signal HITIME is a logic 1, counter 21 is loaded with value zero. Hit time counter 8 is reset until R/P is logic one (ring present is detected).

On reaching a count of 205 in counter 21 as detected at the output of NAND gate 31 (FIG. 5E), R/T goes high (logic one). R/T is reset by the input P/U1 to flip-flop 32 being a logic zero (power down to the line circuit).

Upon detecting one of the selected counts 40, 80, 120, 160, 200 on the counter 21 in NAND gates 33 (after R/T has been detected), the signal $\overline{\text{SHD1}}$ is equal to a logic zero for one half a clock period and causes a signal SHD to be a logic 1. When signal SHD is a logic 1 on "up count" this causes the full scale values to be loaded into the integrater counter 21. When $\overline{\text{SHD}}$ is a logic zero, the output 1Q of flip-flop 34 is logic zero and so when the HITIME pulse arrives the signal $\overline{\text{SET1}}$ remains at logic 1. The trailing edge of the pulse $\overline{\text{HITIME}}$ sets the output 1Q of flip-flop 34 to a logic 1.

Going from OFF-HOOK to ON-HOOK, the pulse HITIME occurs before the signal $\overline{\text{SHD1}}$, thus the signal 1Q equals a logic 1 and the signal SET1 is a logic zero when the pulse HITIME arrives. Thus, the signal SHD is a logic zero indicating an ON-HOOK condition.

Figure 7:
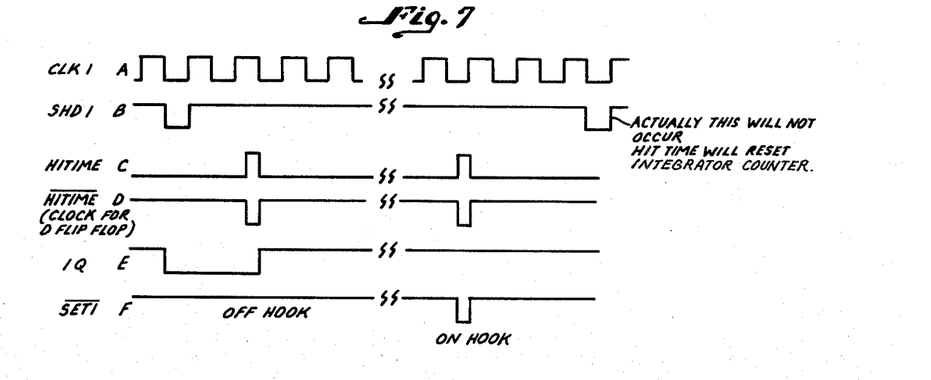
FIG. 7 is a timing diagram illustrating the operation of the switch hook detector of FIG. 5E.

FIG. 7 illustrates the timing diagram of the operation of the switch hook detector circuit shown in FIG. 5E.

While I have described above the principles of my invention in connection with specific apparatus, it is to be clearly understood that this description is made only by way of example and not as a limitation to the scope of my invention as set forth in the objects thereof and in the accompanying claims.

I claim:
1. A digital supervisory circuit for a telephone system comprising:
first means responsive to an input signal representing at least one of ring trip, ring present, on-hook, off-hook and dial pulses to provide an output signal indicating the difference in time said input signal is above and below a predetermined reference potential;
second means coupled to said first means to digitally integrate said output signal;
third means coupled to said first means and said second means, said third means having a first predetermined digital threshold to provide a ring present supervisory signal when said first threshold is exceeded;
fourth means coupled to said first means and said second means, said fourth means having a second predetermined digital threshold to provide a switch hook detection supervisory signal when said second threshold is exceeded; and
fifth means coupled to said second means, said third means and said fourth means to prevent response of said second means and said fourth means to line transients.

2. A circuit according to claim 1, wherein said first means includes
an amplitude comparator having a first input for said input signal and a second input for said reference potential, and
an EXCLUSIVE-OR gate having one input coupled to the output of said comparator and a second input coupled to a binary signal corresponding to the polarity of said reference potential at said second input of said comparator.

3. A circuit according to claim 2, wherein said second means includes an integrating counter.

4. A circuit according to claim 3, wherein said integrating counter includes an up-down binary counter.

5. A circuit according to claims 3 or 4, wherein said second means further includes
sixth means enabling selection of the full scale count of said integrating counter,
seventh means coupled to said sixth means to produce a selected clock for said integrating counter, and
eighth means coupled to said integrating counter, said fifth means and said seventh means to control the loading of said integrating counter.

6. A circuit according to claim 5, wherein said third means includes
ninth means coupled to said seventh means and said first means to produce said ring present supervisory signal when a predetermined logic condition is present for a predetermined number of consecutive binary ones of said selected clock.

7. A circuit according to claim 6, wherein said predetermined number is equal to three.

8. A circuit according to claim 7, wherein said ninth means includes a shift register.

9. A circuit according to claim 8, wherein said fourth means includes
tenth means coupled to said integrating counter to detect one of a plurality of counts of said integrating counter, and
eleventh means coupled to said seventh means, said tenth means and said fifth means to provide said switch hook detection supervisory signal when predetermined logic conditions are present therein.

10. A circuit according to claim 9, wherein said fifth means includes
twelfth means coupled to said sixth means to provide a threshold control signal for said eighth means and said fourth means to prevent response thereof to said line transients, said threshold control signal being compatable with said selected full scale count.

11. A circuit according to claim 1, wherein said second means includes an integrating counter.

12. A circuit according to claim 11, wherein said integrating counter includes an up-down binary counter.

13. A circuit according to claims 11 or 12, wherein said second means further includes
sixth means enabling selection of the full scale count of said integrating counter, seventh means coupled to said sixth means to produce a selected clock for said integrating counter, and eighth means coupled to said integrating counter, said fifth means and said seventh means to control the loading of said integrating counter.

14. A circuit according to claim 13, wherein said third means includes ninth means coupled to said seventh means and said first means to produce said ring present supervisory signal when a predetermined logic condition is present for a predetermined number of consecutive binary ones of said selected clock.

15. A circuit according to claim 14, wherein said predetermined number is equal to three.

16. A circuit according to claim 15, wherein said ninth means includes a shift register.

17. A circuit according to claim 16, wherein said fourth means includes tenth means coupled to said integrating counter to detect one of a plurality of counts of said integrating counter, and eleventh means coupled to said seventh means, said tenth means and said fifth means to provide said switch hook detection supervisory signal when predetermined logic conditions are present therein.

18. A circuit according to claim 17, wherein said fifth means includes twelfth means coupled to said sixth means to provide a threshold control signal for said eighth means and said fourth means to prevent response thereof to said line transients, said threshold control signal being compatible with said selected full scale count.

19. A circuit according to claim 1, wherein said third means includes sixth means coupled to said first and second means to produce said ring present supervisory signal when a predetermined logic condition is present for a predetermined number of consecutive binary ones of a predetermined clock.

20. A circuit according to claim 19, wherein said predetermined number is equal to three.

21. A circuit according to claim 20, wherein said sixth means includes a shift register.

22. A circuit according to claim 21, wherein said fourth means includes seventh means coupled to an integration counter of said second means to detect one of said plurality of counts of said counter and eighth means coupled to said predetermined clock, said seventh means and said fifth means to provide said switch hook detection supervisory signal when predetermined logic conditions are present therein.

23. A circuit according to claim 22, wherein said fifth means includes ninth means coupled to a selection means of said second means to provide a threshold control signal for said second means and said fourth means to prevent response thereof to said line transients.

24. A circuit according to claim 1, wherein said fourth means includes sixth means coupled to an integrating counter of said second means to detect one of a plurality of counts of said counter, and seventh means coupled to a predetermined clock, said sixth means and said fifth means to provide said switch hook detection supervisory signal when predetermined logic conditions are present therein.

25. A circuit according to claim 24, wherein said fifth means includes eighth means coupled to a selection means of said second means to provide a threshold control signal for said second means and said fourth means to prevent response thereof to said line transients.

26. A circuit according to claim 1, wherein said fifth means includes sixth means coupled to a selection means of said second means to provide a threshold control signal for said second means and said fourth means to prevent response thereof to said line transients.

27. A circuit according to claim 1, wherein said first means includes an amplitude comparator, and sixth means coupled to said amplitude comparator to provide a ground potential as said reference potential for said comparator when a call is received by a subscriber and a sine wave signal as said reference potential for said comparator when a call is originated by said subscriber.

28. A circuit according to claim 1, wherein said first, second, third, fourth and fifth means are at least a portion of a large scale integrated circuit.

* * * * *